United States Patent [19]

Machida et al.

[11] Patent Number: 5,542,985
[45] Date of Patent: Aug. 6, 1996

[54] METHOD OF RECYCLING A WASTE RECORDING MEMBER

[75] Inventors: Junji Machida, Toyonaka; Masazumi Yoshida, Amagasaki; Susumu Tanaka, Aiti-ken, all of Japan

[73] Assignee: Minolta Camera Kabushiki Kaisha, Osaka, Japan

[21] Appl. No.: 375,731

[22] Filed: Jan. 20, 1995

Related U.S. Application Data

[62] Division of Ser. No. 208,372, Mar. 10, 1994, abandoned.

[30] Foreign Application Priority Data

Mar. 10, 1993 [JP] Japan .................. 5-049033

[51] Int. Cl.$^6$ ............... B08B 3/04; B08B 3/08; B08B 7/00
[52] U.S. Cl. ................................ 134/38; 134/42
[58] Field of Search ........................... 134/42, 38

[56] References Cited

U.S. PATENT DOCUMENTS

| | | | |
|---|---|---|---|
| 3,538,006 | 11/1970 | Benson et al. | 252/162 |
| 3,983,047 | 9/1976 | Vinson | 252/169 |
| 4,594,111 | 6/1986 | Coonan | 134/3 |
| 4,829,897 | 5/1989 | Wyman et al. | 252/537 |
| 4,854,973 | 8/1989 | Holdar | 134/39 |
| 5,009,716 | 4/1991 | Gerson | 134/40 |
| 5,085,795 | 2/1992 | Narayanan et al. | 252/162 |
| 5,158,710 | 10/1992 | VanEenam | 252/539 |
| 5,194,173 | 3/1993 | Folkard et al. | 252/170 |
| 5,246,503 | 9/1993 | Minick | 134/38 |
| 5,259,969 | 11/1993 | Srivatsa et al. | 252/162 |

FOREIGN PATENT DOCUMENTS

| | | |
|---|---|---|
| 50-156440 | 12/1975 | Japan . |
| 63-165591 | 7/1988 | Japan . |
| 4-89271 | 3/1992 | Japan . |

*Primary Examiner*—Zeinab El-Arini
*Attorney, Agent, or Firm*—McDermott, Will & Emery

[57] ABSTRACT

A method for cleaning waste paper by removing toner-images formed thereon. An emulsion formed cleaning solution, which has a water component, an organic solvent dissolving a resin component, and a surface active agent to form a solution into the emulsion, is applied to the waste paper. The waste paper has a toner-image which is formed by toner-particles which have a resin component. The distance between the fibers of the paper is widened by the water component of the cleaning solution. The resin component of the toner is dissolved by the organic solvent of the cleaning solution.

9 Claims, No Drawings

METHOD OF RECYCLING A WASTE RECORDING MEMBER

This is a divisional of application Ser. No. 08/208,372, filed Mar. 10, 1994, now abandoned.

BACKGROUND OF THE INVENTION

1. Field of the Invention

The present invention relates to a cleaning solution which can remove copy images formed with toner on copy paper by an electrophotographic machine or a printer.

2. Description of the Prior Art

A recycling technique has been paid attention to as a tender technique to the earth from the viewpoint of protection of resources. Recently, copying machines have been popular among companies, offices and other fields. A number of sheets of copy paper are used. Therefore a recycling technique of waste copy paper has been also studied for using the resources effectively.

In the conventional recycling technique, waste copy paper is cut into small pieces of paper for reproducing pulp and then toner which is developed on the waste copy paper is cleaned.

In the conventional recycling technique as above mentioned, however, the waste paper must be once collected and stored at some place. Further there also arise such problems that a pulp-reproducing machine and a toner-cleaning machine are complicated, huge and expensive. Accordingly the recycle of the waste paper has to rely on a specific dealer.

Moreover, in the conventional recycling technique, the length of fibers of the pulp is short even after the pulp is reproduced because the waste copy paper is cut into small pieces of paper. Therefore the reproduced paper is much liable to be torn.

A recycling technique which may solve the above problems is disclosed in Japanese Patent Laid-Open No. Hei 4-89271, in which waste paper is dipped in a cleaning solution such as water, alcohol, methyl ethyl ketone, toluene, ethyl acetate, caustic soda or surface active agent, and then the waste paper is subjected to a physical treatment.

However, the cleaning solution disclosed in the above Japanese Patent cannot achieve the cleaning effects satisfactorily nor can it reproduce paper having satisfactory whiteness.

SUMMARY OF THE INVENTION

Accordingly, the object of the present invention is to provide a cleaning solution which allows waste copy paper to be recycled without being shredded, and regenerated into recycled paper superior in whiteness, and which is easy to handle.

The present invention relates to a cleaning solution for recycling a waste recording member by removing toner-images formed thereon comprising:

water, an organic solvent which dissolve a resin component in toner, and a surface active agent.

DETAILED DESCRIPTION OF THE INVENTION

A cleaning solution for recycling a waste recording member by removing toner-images formed thereon in the present invention comprises:

water, an organic solvent which dissolve a resin component in toner, and a surface active agent.

The organic solvent used in the present invention may be such ones as will not have solubility in water substantially but will dissolve a resin component in toner. Preferably used are, for example, benzene, toluene, xylene, dichloromethane, methyl ethyl ketone, methyl acetate, ethyl acetate, ethyl ether, propyl ether, butyl ether, di-isobutyl ketone, butyl acetate, ethyl butyl acetate, methyl propionate, and ethyl propionate. These organic solvents may be used either singly or in mixture of two or more solvents.

Usable as the surface active agent are anionic surface active agents, nonionic surface active agents, cationic surface active agents, and ampholytic surface active agents, any of which may be selected.

Available as the anionic surface active agents are fatty acid esters, alkyl benzenesulfonates, alkyl naphthalene-sulfonates, alkyl sulfosuccinates, alkyl diphenyl ether disulfonates, alkyl phosphates, polyoxyethylene alkyl sulfates, formalin condensates of naphthalene sulfonates, polymeric surfactant of polycarboxylic acid, and the like.

Available as the nonionic surface active agents are polyoxyethylene alkyl ethers, polyoxyethylene alkyl aryl ethers, block copolymers of oxyethylene-oxypropylene, sorbitan fatty acid esters, polyoxyethylene-sorbitan fatty esters, polyoxyethylene-sorbitol fatty acid esters, glycerin fatty acid esters, polyoxyethylene fatty acid esters, polyoxyethylene alkyl amines, etc.

Available as the cationic surface active agents or the ampholytic surface active agents are alkyl amine salts, quaternary ammonium salts, alkyl betaines, amine oxides, etc.

These surface active agents may be used singly or in mixture of two or more types.

The quantity of the organic solvent in the cleaning solution of the present invention may be selected as appropriate, depending on solubility of toner, compatibility with water, or emulsion stability, and determined from the relation between the quantity of surface active agent and the quantity of water.

The surface active agent in the cleaning solution of the present invention is used in a range of 0.1–10% by weight, preferably about 0.1–2% by weight, of the total quantity of the cleaning solution. Addition of the surface active agent in a ratio greater than 10% by weight would cause a large amount of foams and the like, making the cleaning solution difficult to handle. Also, use of the surface active agent in a ratio smaller than 0.1% by weight would cause once cleaned toner to readhere to the paper, unfavorably. With the use of a surface active agent, the organic solvent and water form a stable O/W type emulsion. Thus, the organic solvent is selectable irrespectively of compatibility with water, which permits a great degree of freedom for selection of the organic solvent.

The quantity of water in the cleaning solution of the present invention should be 30–90% by weight, preferably 40–80% by weight, of the total quantity of the cleaning solution. Water, which serves to widen a distance between paper fibers, can be used to adjust the solubility of the organic solvent. When the cleaning solution did not contain water, the solvent for dissolving the resin component of the toner would not penetrate into the paper fibers, with the result that exposed portions of the paper surface only would be cleaned while toner images inside the paper would still remain tangled with the fibers. Further, the organic solvent would be so strong in solubility that dissolved toner would spread over the inside of the paper fibers, making the paper slightly dirty on the whole.

The cleaning solution of the present invention may further contain an organic acid such as higher fatty acids. An organic acid, when contained, will enhance the penetrability of the cleaning solution into toner and paper, which can be expected to contribute to reduction in cleaning time and increase in cleaning efficiency.

Types of recording members on which the cleaning solution of the present invention has its effect include copy paper or so-called OHP sheets of polyester films, which have toner images containing at least resin component recorded thereon and which are prepared by conventionally known copying machines, printers, facsimiles, or other so-called OA equipment.

Toner images on which the cleaning solution of the present invention has its effect are those formed of toner which comprises a resin, a colorant and, if desired, an offset inhibitor, a charge-controlling agent, a fluidizing agent, and magnetic fine particles.

Preferably applicable to the resin that constitutes the toner are, for example, thermoplastic resins or thermosetting resins, such as styrenic resins, acrylic resins, methacrylic resins, styrene-acryl copolymer resins, styrene-butadiene copolymer resins, polyester resins, epoxy resins, urethane resins, and resins using their copolymers, block copolymers, graft polymers, polymer blends, and the like.

For such a resin, its number-average molecular weight Mn and weight-average molecular weight Mw should be in the range of $1000 \leq Mn \leq 20000$ and $2 \leq Mw/Mn \leq 80$ respectively. It is desirable that the number-average molecular weight Mn is within the range of $2000 \leq Mn \leq 15000$.

For the resin used, preferably, its glass transition point (Tg) is $55°$ C.–$70°$ C. and softening point is $80°$ C.–$140°$ C.

The toner may contain, as black pigments by way of example, carbon black, copper oxide, manganese dioxide, aniline black, activated carbon, ferrite, magnetite, and the like.

Yellow pigments that may be contained in the toner include chrome yellow, zinc yellow, cadmium yellow, yellow oxide, mineral fast yellow, nickel titanium yellow, navel's yellow, naphthol yellow S, Hansa yellow G, Hansa yellow 10G, benzidine yellow G, benzidine yellow GR, quinoline yellow lake, permanent yellow NCG, tartrazine lake, etc.

Red pigments that may be contained in the toner include red chrome yellow, molybdate orange, permanent orange GTR, pyrazolone orange, vulcan orange, indanthrene brilliant orange RK, benzidine orange G, indanthrene brilliant orange GK, red oxide, cadmium red, red lead, permanent red 4R, lithol red, pyrazolone red, Watchung red, lake red C, lake red D, brilliant carmine 6B, eosine lake, rhodamine lake B, alizarin lake, brilliant carmine 3B, permanent orange GTR, vulcan fast orange GG, permanent red F4RH, permanent carmine FB, etc.

Blue pigments that may be contained in the toner include Prussian blue, cobalt blue, alkali blue lake, Victoria blue lake, phthalocyanine blue, etc.

The toner preferably contains these colorants in a quantity range of 1–20 parts by weight, preferably 3–15 parts by weight, relative to 100 parts by weight of the resin of the toner.

Usable as the offset inhibitor are low molecular weight polyethylene wax, low molecular weight polyethylene wax of oxidized type, low molecular weight polypropylene wax, low molecular weight polypropylene wax of oxidized type, higher fatty wax, higher fatty ester wax, sazole wax, etc, which may be used singly or in mixture of two or more types.

The quantity of the offset inhibitor used is 1–15 parts by weight, preferably 2–8 parts by weight, relative to 100 parts by weight of resin in the toner, as particularly preferable for the present invention.

A charge-controlling agent may also be used in the toner. Positive charge-controlling agents preferably applicable to the present invention include nigrosine base EX, quaternary ammonium salts, polyamine compounds, and imidazole compounds.

Otherwise, a negative charge-controlling agent may also be used. The present invention can also be applied to a toner containing, for example, azo dyes of chrome complex salt type, copper phthalocyanine dyes, chrome complex salts, zinc complex salts, aluminum complex salts, etc.

The quantity of these charge-controlling agents is preferably 0.01–10 parts by weight, particularly 0.1–5 parts by weight, relative to 100 parts by weight of resin in the toner.

A fluidizing agent may also be used, such as silica particles, titanium oxide particles, alumina particles, magnesium fluoride particles, silicon carbide particles, boron carbide particles, titanium carbide particles, zirconium carbide particles, boron nitride particles, titanium nitride particles, zirconium nitride particles, magnetite particles, molybdenum disulfide particles, aluminum stearate particles, magnesium stearate particles, and zinc stearate particles.

These particles are desirably subjected to a hydrophobic treatment with silane coupling agents, titanium coupling agents, higher fatty acids, silicone oil, or the like.

Also, various types of organic fine particles may be used singly or in combination, such as styrene-type, acryl-type, methacryl-type, benzoguanamine-type, silicone-type, Teflon-type, polyethylene-type and polypropylene-type organic particles granulated by a wet polymerization process or vapor phase polymerization process, such as emulsion polymerization, soap-free emulsion polymerization, or non-aqueous dispersion polymerization.

The quantity of the fluidizing agent to which the present invention can be preferably applied is 0.05–5 parts by weight, preferably 0.1–3 parts by weight, relative to 100 parts by weight of toner.

Usable as the magnetic fine particles are fine particles of known magnetic materials, for example, metals exhibiting ferromagnetism such as cobalt, iron, and nickel, alloys of such metals as aluminum, cobalt, iron, lead, magnesium, nickel, zinc, antimony, beryllium, bismuth, cadmium, calcium, manganese, selenium, titanium, tungsten, and vanadium, and their mixtures, oxides, and calcined materials (ferrites).

The quantity of the magnetic fine particles preferably added to the toner is 1–80 parts by weight, preferably 5–60 parts by weight, relative to 100 parts by weight of the resin of the toner.

Further, the cleaning solution of the present invention makes it possible to clean away letters written by various types of ball-point pens, marker pens, fluorescent pens, pencils, and stamps put with vermilion ink pad on copy paper.

As steps for cleaning out the toner on copy paper by using the cleaning solution of the present invention, first the copying paper is immersed in the cleaning solution so that the toner is swollen, and thereafter a mechanical shear force is applied onto the paper surface. Immersing conditions may be set as appropriate by taking into account a toner type, a type of cleaning solution, a type of paper, and the like. Allowing a swelling time of 10 seconds to 10 odd minutes after immersion yields a successful result.

The mechanism through which the cleaning solution of the present invention exerts its function, although it is not clear, can be considered as follows.

When copy paper is immersed in the cleaning solution of the present invention, a distance between paper fibers is widened by action of the water contained in the solution, thus permitting the cleaning solution to penetrate into paper inside. By this action of the cleaning solution, fixed toner that has been tangled with paper fibers on the surface of and inside of the copy paper is swollen. Also, the surface active agent encloses the toner that has been buried in the fibers, so that the toner is improved in its releasability with respect to the paper, thus easier to separate out from the paper. Meanwhile, since a dissolving power of the cleaning solution is adjusted by water, the toner will not be completely dissolved nor spread among the paper fibers.

After the paper has been treated up to such a state, lightly rubbing the paper surface with a brush or web and then applying a mechanical shear thereto causes the toner to be easily separated out from the paper surface. The separated toner aggregates and coagulates each other to give rubber-like aggregates. The aggregates have strong adsorptivity to toner particles. As the adsorptivity is stronger than a bonding power between the toner and the paper-fibers, the aggregates seems to suck up the fixed toner from the surface of the paper one after another while contacting with the toner. Further, the surface active agent encloses the cleaned toner, preventing the suspended toner from readhering to the paper. Thus, the cleaning solution of the present invention makes it possible to apply a shear force to the copying paper as it is immersed in the cleaning solution.

The content of water that acts to prevent pulp fibers from gathering each other is lessened to a minimum requirement. Also, pH of the cleaning solution is in the vicinity of neutrality. Thus, the paper is prevented from breakage to a minimum.

The present invention is now described in more detail with reference to examples thereof. It is noted that every "%" which appears in the description of the examples refers to "% by weight" unless otherwise specified.

By using the cleaning solution of the present invention, a print cleaning process was carried out with two types of toner. The following types of toner were used:

Toner A

A toner with a mean particle size of 9.5 μm, which comprises 100 parts by weight of styrene-acryl copolymer resin (Mn: 5400, Mw: 156000, Tg: 60° C.), 10 parts by weight of carbon black (Raven 1250, made by Columbia Carbon K.K.), and 3 parts by weight of offset inhibitor (Biscol 550P, made by Sanyo Kasei Kogyo K.K.) was prepared by a kneading and pulverizing method. This toner is herein referred to as toner A.

Toner B

A toner with a mean particle size of 8.3 μm, which comprises 100 parts by weight of polyester resin (Mn: 4300, Mw: 138000, Tg: 63° C.), 10 parts by weight of carbon black (Mogul L, made by Cabot Japan K.K.), 3 parts by weight of an offset inhibitor (Biscol 550P, made by Sanyo Kasei Kogyo K.K.), and 3 parts by weight of a charge controlling agent (Bontron E-89, made by Orient Kagaku Kogyo K.K.) was prepared by a kneading and pulverizing method. This toner is herein referred to as toner B.

Model EP-4321 and EP-8600 copying machines (both made by Minolta Camera K.K.) were used. Toner A was put into EP-4321 for copying. Toner B was put into EP-8600.

A sheet of paper of A4 size with a weight of 64 g/m$^2$ was used as a copy paper.

A fixing process was carried out at 170° C. in either case.

Cleaning

The copying paper was immersed for 60 seconds in an enough-size pan filled with the cleaning solutions of Examples and Comparative Examples below, respectively. After the immersion, the copying paper was cleaned by lightly rubbing copy paper surface with a web while the paper was kept immersed in the cleaning solution.

Cleaning Solutions Used

Cleaning solutions used are as follows:

Example 1: Toluene (50%)+1% dodecyl benzene sodium sulfonate aqueous solution (50%).

Example 2: Toluene (60%)+2% ELEMINOL ES-20 (polyoxyethylene alkyl phenyl ether sulfate, made by Sanyo Kasei Kogyo K.K.) aqueous solution (40%)

Example 3: dichloromethane (40%)+2% PELEX NB-L (alkyl naphthalene sulfonic soda, made by Kao K.K.) aqueous solution (60%)

Example 4: xylene (30%)+1% ELEMINOL JS-2 (alkyl aryl sulfo-succinate soda, made by Sanyo Kasei Kogyo K.K.) aqueous solution (70%)

Example 5: dichloromethane (10%)+2% PELEX NB-L aqueous solution (90%)

Comparative Example 1: xylene (100%)

Comparative Example 2: toluene (50%)+water (50%)

Evaluation

Cleaning effect of each cleaning solution was evaluated by the following formula:

$$\text{Cleaning efficiency (\%)} = \frac{(ID) - (ID \text{ after cleaned})}{(ID)} \times 100$$

in which ID means copy image density

Evaluation results were classified into three ranks:

80%–100%: O, excellent

70%–80% : Δ, practically usable under 60% : x, practically unusable

Copy images produced by toner A were cleaned by the cleaning solutions of Examples 1, 2, 3 and 5 and Comparative Examples 1 and 2. Copy images by toner B were cleaned by the cleaning solution of Example 4. Results are shown in Table 1.

TABLE 1

| Example/Comparative Example | Toner | Cleaning efficiency (%) | Evaluation |
|---|---|---|---|
| Example 1 | A | 83.5 | o |
| Example 2 | A | 82.0 | o |
| Example 3 | A | 81.7 | o |
| Example 4 | B | 80.4 | 0 |
| Example 5 | A | 79.3 | Δ |
| Comparative Example 1 | A | 13.4 | x |
| Comparative Example 2 | A | 6.2 | x |

What is claimed is:

1. A method for cleaning paper comprising the steps of:

applying an emulsion formed cleaning solution which comprises a water component, an organic solvent dissolving a resin component, and a surface active agent to form a solution into the emulsion, to a paper having an image which is formed by toner particles including the resin component;

widening a distance between fibers in the paper by the water component of the cleaning solution; and dissolving the resin component of the toner by the organic solvent of the cleaning solution for dissolving the resin component.

2. A cleaning method of claim 1, in which the water component is contained at an amount of 30 to 90 wt % of a total of the cleaning solution.

3. A cleaning method of claim 1 in which the surface active agent is contained at an amount of 0.1 to 10 wt % of a total of the cleaning solution.

4. A cleaning method of claim 1, in which the organic solvent is selected from a group consisting of benzene, toluene, xylene, dichloromethane, methyl ethyl ketone, methyl acetate, ethyl ether, propyl ether, butyl ether, di-isobutyl ketone, butyl acetate, ethyl butyl acetate, methyl propionate, ethyl propionate and a mixture thereof.

5. A cleaning method of claim 1, in which the surface active agent is selected from a group consisting of anionic surface active agents, nonionic surface active agents, cationic surface active agents, and ampholytic surface active agents.

6. A cleaning method of claim 1, in which the cleaning solution further comprises a higher fatty acid.

7. A method for cleaning paper comprising the steps of:

applying an emulsion formed cleaning solution which comprises a water component, an organic solvent dissolving a resin component, and a surface active agent to form a solution into the emulsion, to a paper having an image which is formed by toner particles including the resin component wherein the organic solvent is emulsified in the water component;

widening a distance between fibers in the paper by the water component of the cleaning solution; and dissolving the resin component of the toner by the organic solvent of the cleaning solution for dissolving the resin component.

8. A method for cleaning paper comprising the steps of:

applying an emulsion formed cleaning solution which comprises water, an organic solvent dissolving a resin component, and a surface active agent to form a solution into the emulsion, to a paper having an image which is formed by toner particles including the resin component;

widening a distance between fibers in the paper by the water of the cleaning solution;

dissolving the resin component of the toner by the organic solvent of the cleaning solution for dissolving the resin component; and applying a mechanical shear force to the paper surface.

9. The method of claim 8, wherein the water is contained at an amount of 30 to 90 weight percentage of a total of the cleaning solution and the surface active agent is contained at a amount of 0.1 to 10 weight percentage of a total of the cleaning solution.

* * * * *